UNITED STATES PATENT OFFICE.

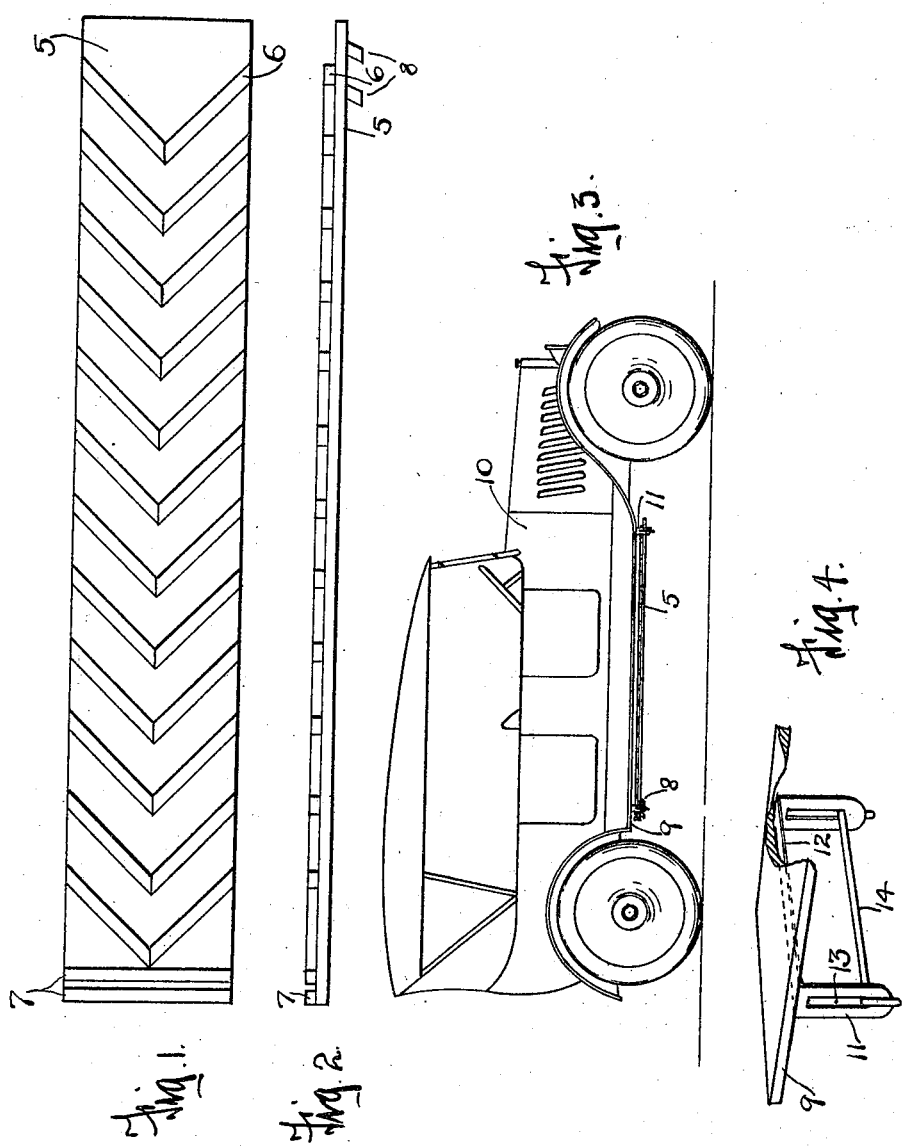

BURNEY C. GENTRY, OF FREEPORT, TEXAS.

TRACTION-SUPPORT.

1,401,689. Specification of Letters Patent. Patented Dec. 27, 1921.

Application filed July 25, 1921. Serial No. 487,438.

*To all whom it may concern:*

Be it known that I, BURNEY C. GENTRY, a citizen of the United States, residing at Freeport, Brazoria county, Texas, have invented a certain new and useful Improvement in Traction-Supports, of which the following is a full, clear, and exact description, such as will enable others skilled in the art to which it appertains to make and use the same.

My invention relates to a traction support for use with motor vehicles.

In operating automobiles on soft roads, difficulty is often experienced by getting the rear wheels down in the mud or sand so that the vehicle becomes stalled. The use of chains on the tires will avoid the sticking of the car in mud or soft earth to some extent but in sandy soil and in deep mud the chains will not be entirely effective for this purpose.

The object of my invention is to provide a device adapted to be placed beneath the rear wheels of a motor vehicle caught in the mud or sand to support the wheels and furnish a rough surface of contact for said wheels whereby the car may be run out of the hole or mire into which it is sunk.

Another object is to provide a means of carrying a number of such devices on an automobile for use when occasion arises, such means being quickly detachable and easily locked in position.

I have found that where a car is stuck in a mud-hole in the road, or where it is sunk in soft sand, the best means to use in extricating the same is to place a board or other similar object beneath the wheel and to furnish means on said board to provide sufficient traction for the wheels to act on. The board not only furnishes a firm support which the wheel may grip as it rotates but, as the wheel runs up out of the hole, it acts to support the wheels for a short space until the driver is ready to start away from the soft portion of the road.

Referring to the drawing herewith, wherein like parts are designated by like numerals of reference in the several views, Figure 1 is a top plan view of my supporting device; Fig. 2 is a side elevation; Fig. 3 is a view of a vehicle showing my device supported thereon and Fig. 4 is a perspective view of the hanger upon which the device is carried.

The support may be made in various ways, but I have found that a board about an inch thick and a foot wide and about five or six feet long will answer the purpose. Upon the upper face of such a board 5, I secure a series of diagonally arranged cleats 6. These cleats are inclined rearwardly to the transverse center of the board and then forwardly, making each cleat of V-shape with the apex pointed rearwardly. At the rear end of the board are a plurality of transverse cleats 7.

On the under side of the board at the forward end are a plurality of rearwardly inclined cleats 8 somewhat thicker than are the V-shaped cleats 6 on the upper side. These cleats furnish a grip upon the material of the roadway so as to prevent the sliding of the support under the action of the wheel.

In use, the rear end is introduced beneath the wheel of a car which is stalled in the mud or sand. The rotation of the wheel will cause the tire to engage the cleats 7 and then the cleats 5 on the upper surface of the support thus acting to draw the said support beneath the wheel. The cleats 8 will hold the support somewhat from sliding and the wheel will thus run out upon the upper surface of the board. The wheel will then rest upon the support momentarily, until the driver is ready to move on. The inclined position of the cleats 6 acts to keep the wheel toward the center of the support, thus preventing the wheel from running off the edge of the board. These cleats also greatly strengthen the board against splitting or breaking under the load of the car. They furnish sufficient traction for the tire to grip and thus enable the car to come out of the rut.

In carrying these boards upon a car, any supporting means may be adopted. I have shown in Fig. 4, a preferred form. On the under side of the running board 9 of the car 10 I place two hangers, one at each end of the running board. The hangers 11 are inverted U-shaped, straps of iron, the bend of the U being flattened at 12 for attachment to the running board. The ends thus hang down a short distance at each side and are slotted at 13 to receive a locking rod 14, both ends of which are bent downwardly. These rods furnish a support for the board which is adapted to rest thereon. When it is desired to remove the traction board, the rod 14 is rotated through 180° and will then slide through the slot 13 and allow the board to drop. When the device is again used as a support the rod 14 is passed back through the slot 13 and rotated to the locking position shown in Fig. 4. I contemplate placing two of the cleats 8 in such position that the rod 14 will come between them when the traction board is supported on the hanger, and thus prevent removal of the traction board longitudinally of the running board of the car. There will be one or more of these traction boards supported under each running board ready for use at all times.

This device will thus be available at all times and will serve to get the car out of holes and ruts where it would otherwise be impossible to move the car without the assistance of another car or a team of horses. It is handy to use, and cheap to manufacture.

Having thus described my invention, the further advantages of which will be obvious, what I claim as new and desire to protect by Letters Patent is:

1. In a device of the character described, a board having inclined cleats on its upper surface, all of said inclined cleats being arranged in V-shape with the apices rearward, and rearwardly inclined cleats on the under side of said board adjacent the forward end thereof.

2. In a device of the character described, a board having cleats on its upper side inclined rearwardly toward the transverse center thereof, a plurality of transverse cleats at the rear end and rearwardly inclined cleats on the under side adjacent the forward end.

3. In a device of the character described, a board having inclined cleats thereon to serve as a traction surface for a vehicle wheel, and means to support said board when out of use, comprising a pair of depending supports having slots therein and a rod adapted to fit in said slots and be locked in place therein.

In testimony whereof, I hereunto affix my signature, this the 9th day of July, A. D. 1921.

BURNEY C. GENTRY.